Aug. 1, 1950 E. W. HEROLD 2,516,990

ULTRA HIGH FREQUENCY MIXER CIRCUITS

Filed Sept. 14, 1942 2 Sheets-Sheet 1

INVENTOR
Edward W. Herold
BY H. S. Grover
ATTORNEY

INVENTOR
Edward W. Herold
BY H. S. Grover
ATTORNEY

Patented Aug. 1, 1950 2,516,990

UNITED STATES PATENT OFFICE 2,516,990

ULTRA HIGH FREQUENCY MIXER CIRCUITS

Edward W. Herold, Spring Lake, N. J., assignor to Radio Corporation of America, a corporation of Delaware Application September 14, 1942, Serial No. 458,189

24 Claims. (Cl. 250—20)

This invention relates to improvements in ultra high frequency circuits.

One of the objects of the present invention is to provide a novel type of transmission line circuit having two fundamental resonance frequencies, both of which are separately adjustable.

Another object is to provide a transmission line circuit of two fundamental resonance frequencies having a pair of conductors intimately associated with a spaced conducting surface by means of which the pair of conductors form a balanced circuit for one resonance frequency and an unbalanced circuit relative to said spaced surface for the other resonance frequency.

A further object is to provide a transmission line circuit having two fundamental resonance frequencies, both of which are separately adjustable for use in a converter or mixer stage of a superheterodyne receiver, whereby the two resonance frequencies correspond to the signal and local oscillator frequencies.

A feature of the present invention lies in the use of a pair of parallel rod-like conductors similarly spaced from a conducting surface, with separate adjusting elements for adjusting the lengths of the parallel conductors relative to one another and the lengths of the parallel conductors as a unit relative to the spaced conducting surface.

Other objects and features of the invention will appear from a reading of the following description.

The present invention will be described with especial reference to a superheterodyne receiver circuit, particularly the frequency converter or mixer stage, although it should be understood that the invention has wider application as will appear in more detail hereinafter.

It is the general practice in using frequency converter tubes for ultra high frequency superheterodyne receivers to employ triodes, pentodes and other special types of tubes which require both signal and local oscillator voltages to be applied across the same electrodes, in view of the advantages these tubes possess from a sensitivity and signal-to-noise ratio standpoint. At the lower radio frequencies, such as in the broadcast band, a circuit tuned to the signal frequency and a second circuit tuned to the local oscillator frequency, may be connected in series between the input electrodes. At higher frequencies, let us say above ten megacycles, because of the low reactances of the stray and interelectrode capacitances, it no longer becomes possible to connect separated circuits in series. It has been customary to use an input circuit tuned to the signal frequency to obtain good results in ultra high frequency converter circuits. In such circuits, the most common solution to the oscillator injection problem has been to apply sufficient oscillator voltage to the signal input circuit by brute force methods; that is, using a powerful local oscillator with loose coupling to the input circuit. A disadvantage of this arrangement lies in the fact that it is difficult to obtain sufficient excitation from the local oscillator for the converter or mixer tube when the signal input circuit is sufficiently sharp to give good image rejection. This is because the local oscillator frequency falls far to one side of the resonance curve of the input circuit.

Another difficulty in using converter tubes in superheterodyne receivers occurs at ultra high frequencies above 500 megacycles; for example, where it becomes difficult to provide a local oscillator of sufficient stability and ease of operation. In these cases it has been found advantageous to operate the local oscillator at one-third or one-half of the frequency normally required. Since the signal and local oscillator frequencies are now very widely separated, many conventional methods of operation are attended be even greater difficulties than normally.

The foregoing disadvantages are overcome by the present invention which employs a novel type of transmission line circuit which has two independent natural resonance frequencies instead of the usual one; as a result of which one resonance frequency may be adjusted to correspond to the local oscillator frequency and the other resonance frequency adjusted to the signal frequency.

A more detailed description of the invention follows in conjunction with a drawing, wherein.

Figures 1, 1A:
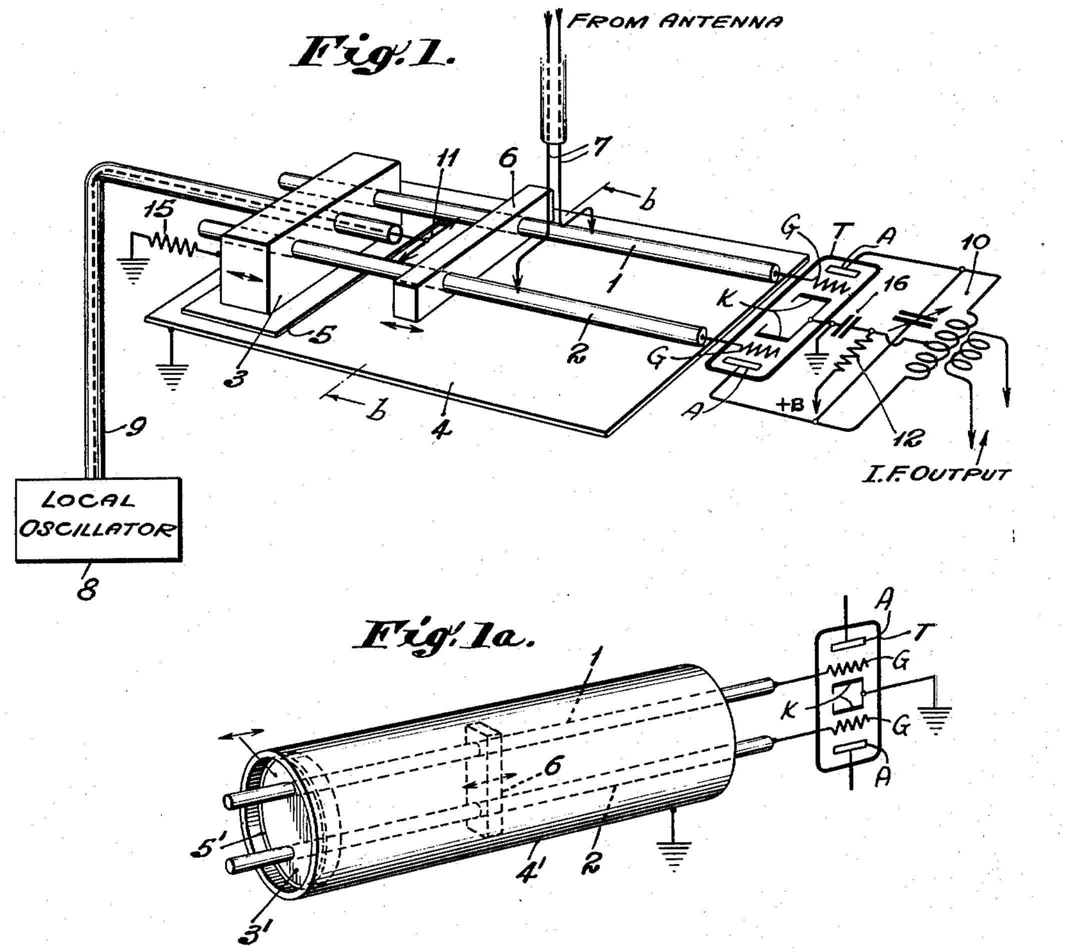
Figs. 1, 2 and 3 illustrate, by way of example only, three different embodiments of the invention as applied to a mixer stage of a superheterodyne receiver.
Figure 1B:
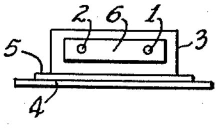

Fig. 1*a* shows a modification of the improved transmission line circuit of the system of Fig. 1; and Fig. 1*b* shows a sectional view of Fig. 1 along the line *b*—*b*.

Throughout the figures of the drawing, the same elements are represented by the same reference numerals, while equivalent or similar elements are represented by the same reference numerals having prime designations.

Referring to Fig. 1 in more detail, there is shown the converter or mixer stage of a superheterodyne receiver. It should be understood that only those essential elements of the receiver are illustrated which are necessary for an understanding of the principles of the invention. The converter or mixer tube T comprises a pair of triode electrode structures (which may be considered as a pair of networks having similar electrical characteristics), each of which includes a cathode K, a grid G and an anode A. The anodes are connected in push-pull to a parallel tuned output circuit 10 tuned to the intermediate frequency. The cathodes are connected together and to ground, and connected through a by-pass condenser 16 to an intermediate point on the inductance coil of the tuned output circuit. A suitable positive polarizing potential is applied to the anodes A through a resistor 12 of such value as to prevent the radio frequency energy in the tuned circuit 10 from entering the lead to the source of anode polarizing potential. The grids G of the two electrode structures of the tube T are connected to the improved transmission line circuit of the invention constituting, in effect, a pair of parallel rod-like conductors 1, 2 which extend from the grids of the tube T to a metallic block 3 shunting both conductors 1, 2 near one end and slidable along their lengths. Block 3 is mounted upon a grounded metallic base plate or sheet 4 and insulated therefrom by a mica sheet 5. In effect, slidable tuning block 3 and base plate 4 are connected together from a radio frequency standpoint through mica sheet 5. The rod-like conductors 1 and 2 are also connected together at a point intermediate their ends by means of a sliding short-circuiting metallic bar 6 which is adjustable over the lengths of the conductors and placed at a location between the tuning block 3 and the grids of the tube T. In effect, those portions of conductors 1, 2 located between short-circuiting element 6 and block 3 can be considered as a conducting extension for the conductors 1, 2. The input to the receiver (here shown by way of example as an antenna) is shown connected to the rods 1, 2 by means of a pair of leads 7 which are adjustable over the conductors 1, 2 in order to properly adjust the antenna coupling. The local oscillator is here designated conventionally in box form by reference numeral 8 and is connected through a coaxial line 9 to the rod-like conductors 1, 2 at a location between the two tuning elements 3, 6. For this purpose, a suitable slider 11 is connected to both conductors 1 and 2 and connected to the inner conductor of the coaxial line 9. Slider 11 serves to adjust the excitation voltage of the local oscillator as applied to the grids of tube T. Resistor 15 is a high resistance grid leak for supplying bias on the grids. It will thus be seen that the oscillator 8 is connected in parallel to both rods 1, 2 through line 9 and slider 11, while the input to the receiver (in this case the antenna) is connected in push-pull to the rods 1, 2 through leads 7.

A description of the operation of the improved transmission line circuit of the invention will now be given: Conductors 1, 2, considered from the open ends which are connected to the grids G of the tube T to the tunable shorting bar 6, constitute a tuned circuit whose resonance frequency depends upon the linear length of the conductors 1, 2 between the bar 6 and the tube T. Both of these conductors, however, considered in parallel or as a unit from the open end connected to the grids G of tube T to the tunable shorting block 3 may be looked at as a single conductor and these conductors together with the metallic base plate 4 constitute another tuned circuit having a resonance frequency depending primarily upon the linear length of the parallel conductors 1 and 2 between the block 3 and the tube T. It should be noted that the tuning slider 6 does not contact the metallic base plate 4, nor is it capacitively coupled thereto in the manner described heretofore in connection with block 3. It will thus be seen that short circuiting bars 3 and 6 provide independent adjustments of the two resonance frequencies of the transmission line circuit. Inasmuch as the signal input is applied to the grids G of the tube T in push-pull or out-of-phase relationship, and energy from the local oscillator is applied to the grids of the tube T in parallel or cophasal relationship, the tube T will function in normal fashion as a mixer or converter for providing an intermediate frequency in the push-pull output circuit 10. Because of the independent resonance adjustments obtainable by the improved transmission line circuit of the invention, a small voltage applied to the conductors 1, 2 from the local oscillator 8 will build up a relatively large voltage at the open ends of the conductors 1, 2 for utilization by the grids of the tube T. Thus, when the local oscillator frequency is one-half or one-third of that normally used (that is, one-third or one-half of the frequency difference between the signal frequency and intermediate output frequency) no difficulty is encountered in obtaining ample excitation for the grids of the mixer tube. This is a distinct advantage over conventional circuits which are unable to take advantage of the characteristics of a resonant circuit to build up a large voltage at the local oscillator frequency. The advantage of the present invention is even greater, inasmuch as proper frequency conversion or mixing in tubes when using an oscillator of one-half or one-third of normal frequency requires a much greater oscillator injection voltage at the grids of the converter or mixer tube than is required when the oscillator is used at normal frequency.

From a practical standpoint, it is deemed advisable to employ a round shield instead of the flat metallic base plate 4. Fig. 1*a* shows such a preferred arrangement. In this figure, the metallic shield 4′ surrounds the parallel conductors 1, 2 and provides a completely shielded system with a minimum of radiation loss. A sliding disc 3′ adjustable over the rods 1, 2 corresponds in function to the metallic tuning block 3 of Fig. 1. Disc 3′ is insulated from grounded shield 4′ by means of insulating member 5′ attached to and slidable with the disc, and forming therewith a capacitive radio-frequency bypass. The tube T and the local oscillator, not shown, are connected to the system in the same manner illustrated in Fig. 1. The signal input circuit and the output circuit of tube T of Fig. 1*a* also follow the arrangement of Fig. 1, but are not illustrated for the sake of simplifying the drawing.

Figure 2:
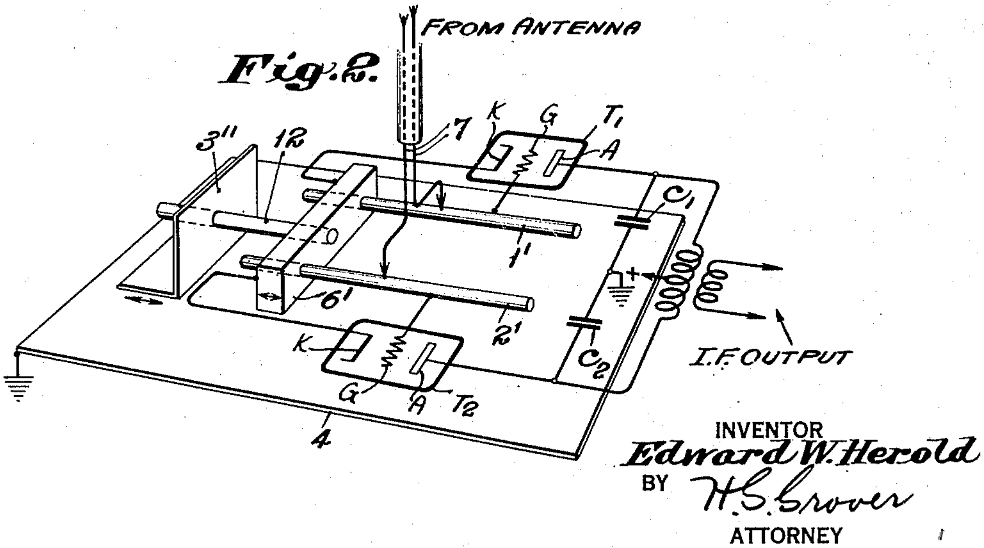

Fig. 2 shows a modification of the transmission line circuit of the invention as applied to a frequency converter which is of the self-oscillating type. Although two tubes $T_1$ and $T_2$ are shown in Fig. 2, it should be understood that this is merely by way of illustration, since if desired either two triodes within separate envelopes or two triode structures within the same envelope can be employed interchangeably. This also holds true for the other figures of the drawing. The transmission line circuit of the invention in Fig. 2 comprises the two conductors 1', 2' which are connected together by shorting slider bar 6'. Bar 6' is adjustable over the lengths of conductors 1', 2' for tuning conductors 1', 2' to the resonance frequency corresponding to the signal input frequency. This signal input voltage obtained from conductors 7 is applied to the grids G of the converter stage in push-pull relation. An adjustable tuning element 3'' is slidable on rod-like conductor 12 and connects the pair of conductors 1', 2' to the plate 4. In this particular figure, the mica insulation present in Fig. 1 has been omitted and the adjustable plate 3'' connected directly to the metal base plate 4. Movement of the plate 3'' serves to adjust the resonance frequency of the local oscillator consisting of the two tubes $T_1$, $T_2$ operating substantially in parallel at this frequency. It should be noted that the oscillator tuning system comprises, in effect, conductors 1', 2' (which can be considered as a single conducting element by virtue of the connection produced by the sliding shorting bar 6') together with rod 12, sliding element 3'', and base plate 4, all of which as a unit comprise the tuned circuit for the local oscillator. The cathodes K of the two electrode structures are connected to the slidable shorting bar 6' at a point intermediate the grids and the tuning slider 3''. The feedback from the anodes A of the mixer stage to the oscillating circuit is achieved by virtue of the intermediate frequency tuning condensers $C_1$, $C_2$ which are connected together and serve as by-pass condensers at the frequency of oscillation. The junction of the condensers $C_1$ and $C_2$ is grounded.

Figure 3:
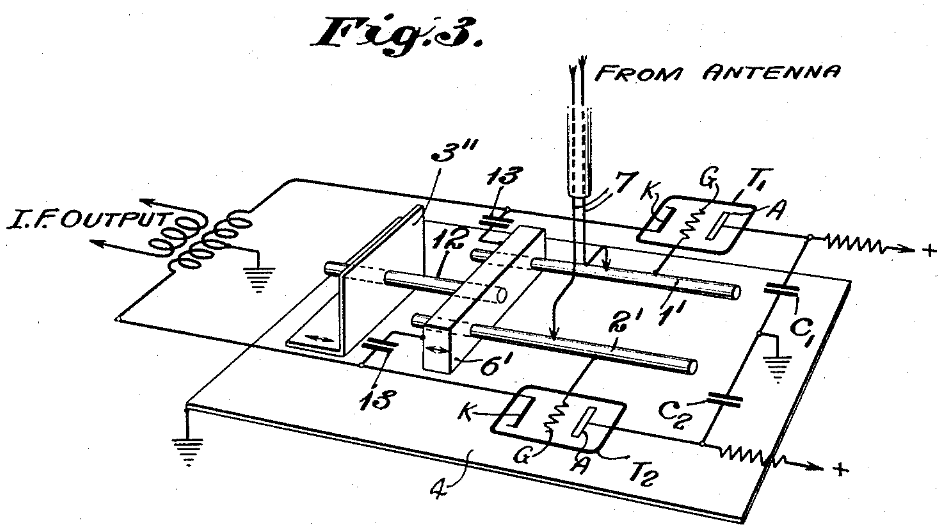

Fig. 3 is a modification of the circuit of Fig. 2, the difference residing primarily in the manner of deriving the output energy from the system. In Fig. 2 the intermediate frequency output power is taken from the anodes A of the mixer stage while in Fig. 3 the intermediate frequency output is taken from the cathodes K. These cathodes K, it should be noted, are connected through by-pass condensers 13 to the bar 6'. Condensers 13 also serve to tune the intermediate frequency output circuit. In effect, the triode electrode structures of the mixer stage of Fig. 3 may be said to be operating as diodes from the mixing point of view; although from the self-oscillating point of view the anode current through condensers $C_1$, $C_2$ serves to complete the feed-back path.

Figure 4:
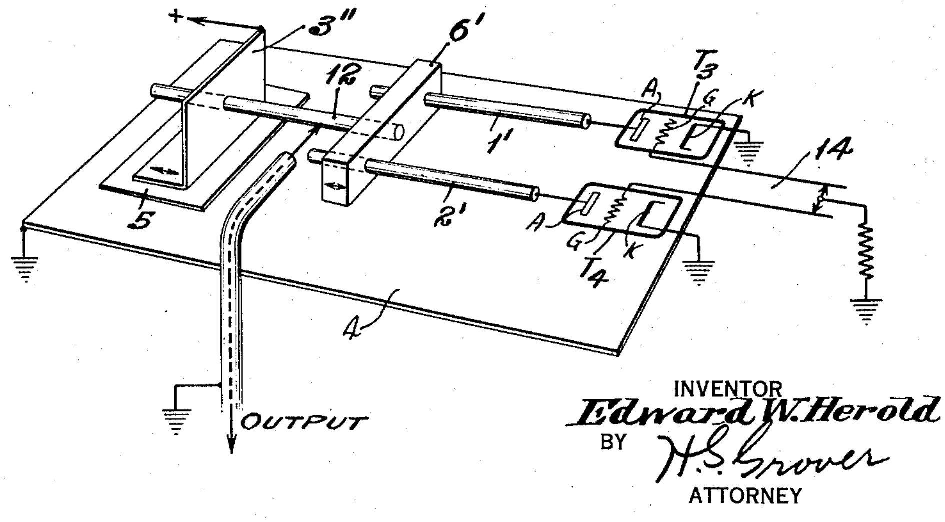
Fig. 4 illustrates another embodiment of the invention as applied to an oscillator circuit for the purpose of augmenting even order harmonics.

Fig. 4 illustrates the application of the improved transmission line circuit of the invention to an oscillator circuit for the purpose of augmenting the production of even order harmonics. The oscillator circuit is shown as including a pair of triode vacuum tubes $T_3$ and $T_4$ whose grids G are connected in push-pull through a tunable lecher wire system 14 and whose anodes A are connected to the improved transmission line circuit of the invention. In this case, the improved transmission line of the invention comprises the anode circuit of the oscillator. In effect, the system of Fig. 4 is a tuned grid, tuned anode oscillator, the tuned anode circuit being constituted by the elements 1', 6', 2' which together determine the fundamental frequency of oscillation. The even harmonic frequencies, however, in the tuned anode circuit constituting elements 1', 6', 2' flow through rod 12 and tuning slider 3'' to the metallic plate 4 to constitute therewith another tuned circuit resonant to the desired even harmonic. In view of the fact that slider 6' is situated between slider 3'' and the anodes, it is clear that the circuit comprising in effect conductors 1' and 2' in parallel and extending through rod 12 to slider 3'' must be operated at a higher order resonance in order to tune to the desired even harmonic. As a particular example, if the distance from the anodes to slider 6' is a little less than one-quarter wavelength at the fundamental frequency of oscillation, the distance from 3'' to the anodes should be made slightly less than three-eighths of a wavelength so that at the second harmonic of the local oscillator frequency this latter distance would be in three-quarter wave resonance. Slider 3'' will usually include a blocking condenser formed by mica sheet 5 to enable the introduction of anode voltage, as shown. In the oscillating circuit of Fig. 4, the production of second harmonic or any even harmonic frequency is aided by the presence of the resonant circuit from the anodes of slider 3'' at the harmonic considered. Output from such a harmonic may therefore be taken from this resonant circuit.

The transmission line circuits of Figs. 1 and 2 are in practice interchangeable. As in Fig. 1, the sliders 6' of Figs. 2, 3 and 4 are not in direct contact with plate 4.

The term "ground" used herein is not limited to an actual earthed connection, and is deemed to include any surface of fixed alternating current potential, such as, for example, a surface at zero radio frequency potential.

What is claimed is:

1. An electron discharge device system comprising a pair of electrode structures, a transmission line circuit comprising a pair of parallel conductors connected to corresponding electrodes of said electrode structures, a short-circuiting element shunting said parallel conductors and adjustable over at least a portion of the lengths of said conductors, a metallic surface of zero radio frequency potential substantially equally spaced from said pair of parallel conductors, a conducting extension for said pair of conductors located beyond said short circuiting element, and a short-circuiting element connecting said extension to said surface and adjustable over a portion at least of said extension, said last short-circuiting element being located at a distance from said corresponding electrodes which is different from one-half wavelength or an integral multiple thereof at an operating frequency, whereby said pair of conductors form a balanced circuit for one resonance frequency and an unbalanced circuit relative to said surface for a different resonance frequency, and means for supplying high frequency energy to said last short-circuiting element.

2. A transmission line circuit comprising a pair of parallel conductors, a short-circuiting element shunting said parallel conductors and adjustable over at least a portion of the lengths of said conductors, a metallized flat sheet located in a plane parallel to the plane of said parallel conductors, a conducting extension for said pair of conductors located beyond said short-circuiting element, a short-circuiting element connecting said extension to said sheet from a radio frequency standpoint and adjustable over a portion at least of said extension, whereby said pair of conductors form a balanced circuit for one resonance frequency and an unbalanced circuit relative to said sheet for a different resonance frequency, and means for supplying high frequency energy to said last short-circuiting element.

3. An electron discharge device system comprising a pair of electrode structures, a transmission line circuit comprising a pair of parallel conductors, a short-circuiting element shunting said parallel conductors and adjustable over at least a portion of the length of said conductors, a metallic surface of zero radio frequency potential substantially equally spaced from said pair of parallel conductors, a conducting extension for said pair of conductors located beyond said short circuiting element, and a short-circuiting element connecting said extension to said surface and adjustable over a portion at least of said extension, said last short-circuiting element being located at a distance from said corresponding electrodes which is different from one-half wavelength or an integral multiple thereof at an operating frequency, whereby said pair of conductors form a balanced circuit for one resonace frequency and an unbalanced circuit relative to said surface for a different resonance frequency, said surface being at least as long as the overall length of said pair of conductors and their extension, and means for supplying high frequency energy to said last short-circuiting element.

4. A transmission line circuit comprising a pair of parallel conductors, a short-circuiting element shunting said parallel conductors and adjustable over at least a portion of the lengths of said conductors, an electrically conducting extension for said pair of conductors beyond said short-circuiting element, a metallic shield surrounding said pair of conductors and element, and a short-circuiting element connecting said extension to said shield and adjustable over a portion at least of said extension at a location such that said pair of conductors form a balanced circuit for one resonance frequency and an unbalanced circuit relative to said shield for a different resonance frequency.

5. An electron discharge device circuit having a pair of electron discharge device electrode structures containing similar electrodes and comprising electron space discharge paths, a transmission line circuit comprising a pair of parallel conductors, connections between the one end of said line circuit and a pair of corresponding electrodes of said electrode structures, a short-circuiting element shunting said parallel conductors and adjustable over at least a portion of the length of said conductors, a metallic surface of zero radio frequency potential substantially equally spaced from said pair of parallel conductors, a conducting extension for said pair of conductors, a short-circuiting element connecting said extension to said surface from a radio frequency standpoint and adjustable over a portion at least of said extension, said last short-circuiting element being located at a distance from said corresponding electrodes which is different from one-half wavelength or an integral multiple thereof at an operating frequency, whereby said pair of conductors form a balanced circuit for one resonance frequency and an unbalanced circuit relative to said surface for a different resonance frequency and means for supplying high frequency energy to said last short-circuiting element.

6. A frequency converter stage including an evacuated electron discharge device circuit having a pair of electrode structures, each including a grid and a cathode, a transmission line circuit comprising a pair of parallel conductors, connections between said pair of conductors and the grids of said electrode structures, a short-circuiting element shunting said parallel conductors and adjustable over at least a portion of the length of said conductors, a metallic surface of zero radio frequency potential substantially equally spaced from said pair of parallel conductors, a conducting extension for said pair of conductors beyond said short-circuiting element, and another short-circuiting element connecting said extension to said surface and adjustable over a portion at least of said extension at a location such that said pair of conductors form a balanced circuit for one resonance frequency and an unbalanced circuit relative to said surface for a different resonance frequency, a connection between the cathodes of said electrode structures, and a signal input circuit connected to said pair of parallel conductors.

7. A frequency converter stage including an evacuated electron discharge device circuit having a pair of electrode structures, each including a grid and a cathode and an anode, a transmission line circuit comprising a pair of parallel conductors, connections between said pair of conductors and the grids of said electrode structures, a short-circuiting element shunting said parallel conductors and adjustable over at least a portion of the length of said conductors, a metallic surface of zero radio frequency potential substantially equally spaced from said pair of parallel conductors, a conducting extension for said pair of conductors located beyond said short-circuiting element, a short-circuiting element connecting said extension to said surface and adjustable over a portion at least of said extension at a location such that said pair of conductors form a balanced circuit for one resonance frequency and an unbalanced circuit relative to said surface for a different resonance frequency, a connection between the cathodes of said electrode structures, and a signal input circuit connected to said pair of parallel conductors for applying out-of-phase potentials thereto, and a parallel tuned output circuit coupled to the anodes of said electrode structures.

8. A frequency converter stage including an evacuated electron discharge device circuit having a pair of electrode structures, each including a grid and a cathode and an anode, a transmission line circuit comprising a pair of parallel conductors, connections between said pair of conductors and the grids of said electrode structures, a short-circuiting element shunting said parallel conductors and adjustable over at least a portion of the length of said conductors, a metallic surface of zero radio frequency potential substantially equally spaced from said pair of parallel conductors, a conducting extension for said pair of conductors located beyond said short-circuiting element, a short-circuiting element connecting said extension to said surface and adjustable over a portion at least of said extension at a location such that said pair of conductors form a balanced ciruict for one resonance frequency and an unbalanced circuit relative to said surface for a different resonance frequency, a connection between the cathodes of said electrode structures, and a signal input circuit connected to said pair of parallel conductors for applying out-of-phase potentials thereto, a heterodyne oscillator coupled to said extension for supplying cophasal potentials to said pair of conductors, and an output circuit coupled in push-pull to the anodes of said electrode structures.

9. A self-oscillating type of frequency converter comprising an evacuated electron discharge device circuit including a pair of electrode structures each including a cathode, a grid and an anode, a transmission line circuit comprising a pair of parallel conductors, connections between said pair of conductors and the grids of said electrode structures, a short-circuiting element shunting said parallel conductors and adjustable over at least a portion of the length of said conductors, a metallic surface of zero radio frequency potential substantially equally spaced from said pair of parallel conductors, a conducting extension for said pair of conductors located beyond said short-circuiting element, and a short-circuiting element connecting said extension to said surface and adjustable over a portion at least of said extension, whereby said pair of conductors form a balanced circuit for one resonance frequency and an unbalanced circuit relative to said surface for a different resonance frequency, a connection between the cathodes of said electrode structures, a signal input circuit connected to said pair of parallel conductors to apply out-of-phase potentials thereto, and a tuned output circuit coupled to a pair of corresponding electrodes of said electrode structures other than said grids.

10. An electron discharge device circuit having a pair of evacuated electrode structures each including an anode, a cathode and a grid, a transmission line circuit comprising a pair of parallel conductors, connections between said parallel conductors and the anodes of said electrode structures, a short-circuiting element shunting said parallel conductors and adjustable over at least a portion of the length of said conductors, a metallic surface of zero radio frequency potential substantially equally spaced from said pair of parallel conductors, a conducting extension for said pair of conductors located beyond said short-circuiting element, and a short-circuiting element connecting said extension to said surface and adjustable over a portion at least of said extension at a location such that said pair of conductors form a balanced circuit for one resonance frequency and an unbalanced circuit relative to said surface for a different resonance frequency, a tuned circuit coupled to the grids of said electrode structures, a connection between the cathodes of said electrode structures, and an output circuit coupled to said extension.

11. A transmission line circuit comprising a pair of parallel conductors, a short-circuiting element shunting said parallel conductors, a metallic surface of zero radio frequency potential substantially equally spaced from said pair of parallel conductors, a conducting extension for said pair of conductors located beyond said short-circuiting element, and a short-circuiting element connecting said extension to said surface, said last short-circuiting element being spaced from those ends of said parallel conductors which are furthest removed from said extension by a distance which is different from one-half wavelength or an integral multiple thereof at an operating frequency, whereby said pair of conductors form a balanced circuit for one resonance frequency and an unbalanced circuit relative to said surface for a different resonance frequency and means for supplying high frequency energy to said last short-circuiting element.

12. A transmission line circuit comprising a pair of parallel conductors open at one end, a short-circuiting element near the other end of and shunting said parallel conductors, a metallized flat sheet located in a plane parallel to the plane of said parallel conductors, a conducting extension for said pair of conductors located beyond said short-circuiting element, and a short-circuiting element connecting said extension to said sheet, whereby said pair of conductors form a balanced circuit for one resonance frequency and an unbalanced circuit relative to said sheet for a different resonance frequency, and means for supplying high frequency energy to said last short-circuiting element.

13. In combination, a multi-electrode electron discharge device utilization circuit, a transmission line circuit comprising a pair of parallel conductors, connections from one end of said conductors to different electrodes of said utilization circuit, a slide shunting said parallel conductors and adjustable over at least a portion of the lengths of said conductors, a source of waves coupled in push-pull to said conductors at a location between said slider and said utilization circuit, a metallic surface of zero radio frequency potential substantially equally spaced from said conductors and extending parallel thereto, a conducting extension for said conductors located beyond said slider, an adjustable element connecting said extension to said surface from a radio frequency standpoint, and a source of waves having a frequency different from said first source coupled to said pair of conductors in cophasal relationship, whereby said pair of conductors forms a balanced circuit for one resonance frequency, and an unbalanced circuit relative to said surface for a different resonance frequency.

14. A frequency converter stage including an evacuated electron discharge device circuit having a pair of electrode structures, each including a grid and a cathode and an anode, a transmission line circuit comprising a pair of parallel conductors, connections between said pair of conductors and the grids of said electrode structures, a short-circuiting element shunting said parallel conductors and adjustable over at least a portion of the length of said conductors, a metallic surface of zero radio frequency potential substantially equally spaced from said pair of parallel conductors, a conducting extension for said pair of conductors located beyond said short-circuiting element, a short-circuiting element connecting said extension to said surface and adjustable over a portion at least of said extension, whereby said pair of conductors form a balanced circuit for one resonance frequency and an unbalanced circuit relative to said surface for a different resonance frequency, a connection between the cathodes of said electrode structures, and a signal input circuit connected to said pair of parallel conductors for applying out-of-phase potentials thereto, a heterodyne oscillator coupled to said extension for supplying cophasal potentials to said pair of conductors, and an output circuit coupled in push-pull to a pair of corresponding electrodes other than said grids of said electrode structures.

15. In combination, a transmission line circuit comprising a pair of parallel conductors, a short-circuiting element shunting said parallel conductors and adjustable over at least a portion of the lengths of said conductors, a metallic surface of zero radio frequency potential substantially equally spaced from said pair of parallel conductors, a conducting extension for said pair of conductors located beyond said short-circuiting element, and a short-circuiting element connecting said extension to said surface and adjustable over a portion at least of said extension, whereby said pair of conductors form a balanced circuit for one resonance frequency and an unbalanced circuit relative to said surface for a different resonance frequency, two sources of waves of said different resonance frequencies, and connections coupling one of said sources to said parallel conductors in cophasal relationship and the other of said sources to said parallel conductors in an out-of-phase relationship.

16. A self-oscillating electron discharge device frequency mixer system having a pair of electrodes coupled to a two-conductor transmission line, a source of alternating current energy coupled to the conductors of said line in push-pull relation, a third conductor, said line comprising a tuned circuit for the frequency of said source, said line and said third conductor together comprising a resonant circuit which controls the frequency of operation of said self-oscillating discharge device at another frequency.

17. An electron discharge device having a pair of electrode structures each including a grid and an output electrode, connections from said grids to one end of a two conductor transmission line, a source of alternating current energy coupled to the conductors of said line in push-pull relation, another source of alternating current energy of a frequency different from that of said first source, means coupling said other source to the conductors of said line in electrically parallel relation, and an output circuit coupled in push-pull to said output electrodes, said output circuit being tuned to a frequency different from either of said two sources.

18. A frequency mixer circuit for a superheterodyne receiver, having a pair of electrode structures, a two-conductor transmission line coupled at one end to corresponding electrodes of said structures, an adjustable short-circuiting element across the conductors of said line at points intermediate the ends of said line, a conducting extension for said line located beyond said short-circuiting element, said line comprising a push-pull tuned circuit for one frequency, a third conductor coupled to said extension through a path of low impedance for high frequency energy, said line and third conductor together comprising a parallel tuned circuit which is resonant to another frequency.

19. An electron discharge device system having a pair of similar electrodes coupled to one end of a two-conductor transmission line, a source of signal energy of a predetermined frequency coupled in push-pull to the conductors of said line at points intermediate the ends thereof, an adjustable short-circuiting element connected across said line, a conducting extension for said line located beyond said short-circuiting element, a metallic surface coupled through a path of low impedance for high frequency energy to said extension, and a source of alternating current energy of a lower frequency coupled to said extension, said line being a part of two circuits tuned to the frequencies of said two sources, said line having such dimensions as to build up the voltage supplied to it by said source of alternating current to a relatively larger voltage available at said electrodes.

20. In a receiver for ultra high frequency waves, the combination of a source of signal waves, a source of local oscillations, a push-pull converter, a transmission line connected between said source of local oscillations and said converter, means for tuning a portion of said transmission line to the frequency of said waves, coupling means including said portion of said transmission line for supplying waves from said signal source to said push-pull converter in opposing phase relation, and separate means for tuning said transmission line between the ends thereof to the frequency of said local oscillations thereby to supply said oscillations to said converter in like phase relation.

21. In a receiver for ultra high frequency waves, a balanced converter, a section of two-conductor transmission line coupled to said converter, means for supplying locally produced oscillations to said line, means for supplying incoming signal waves to the conductors of said line such that said waves are supplied to said balanced converter in a predetermined phase relation, means for tuning at least a portion of said line to the frequency of said incoming waves, and separate means for tuning said line to the frequency of said locally produced oscillations, to thereby supply said oscillations to said converter in a phase relation different from said aforesaid predetermined relation.

22. For use with a high frequency receiving system, a two-conductor transmission line having one end coupled to a pair of networks having similar electrical characteristics, at least one of said networks comprising part of the mixer circuit of said receiving system, means coupled in push-pull to the conductors of said line at points intermediate the ends thereof for supplying high frequency energy thereto of a predetermined frequency, a short-circuiting element connected across said line, a conducting extension for said line located beyond said short-circuiting element, a metallic surface surrounding said transmission line and coupled to said extension for high frequency energy, and means for applying alternating current energy of a different frequency to said extension, said line being a part of two circuits tuned to the aforesaid two frequencies, said line having such dimensions as to build up the voltage supplied to it by one of said means to a relatively larger voltage available at said networks.

23. A transmission line circuit comprising a pair of parallel conductors, a short-circuiting element shunting said parallel conductors and adjustable over at least a portion of the lengths of said conductors, an electrically conducting extension for said pair of conductors beyond said short-circuiting element, a metallic can-like shield surrounding said pair of conductors and element, and a short-circuiting element forming one end of said can-like shield and connecting said extension to said shield at a location such that said pair of conductors form a balanced circuit for one resonance frequency and an unbalanced circuit relative to said shield for a different resonance frequency, said shield serving to minimize radiation from said pair of parallel conductors.

24. An electron discharge device circuit having a pair of evacuated electrode structures each including an anode, a cathode and a grid, a transmission line circuit comprising a pair of parallel conductors, connections between said parallel conductors and the anodes of said electrode structures, means for tuning said transmission line circuit, a metallic surface of zero radio frequency potential substantially equally spaced from said pair of parallel conductors, a conducting extension for said pair of conductors and tuning means connecting said extension to said surface and adjustable at a location such that said pair of conductors form a balanced circuit for one resonance frequency and an unbalanced circuit relative to said surface for a different resonance frequency, a tuned circuit coupled to the grids of said electrode structures, a connection between the cathodes of said electrode structures, and an output circuit coupled to said extension.

EDWARD W. HEROLD.

REFERENCES CITED

The following references are of record in the file of this patent:

UNITED STATES PATENTS

| Number | Name | Date |
|---|---|---|
| 2,050,598 | Braden | Aug. 11, 1936 |
| 2,106,776 | Trevor et al. | Feb. 1, 1938 |
| 2,175,710 | Usselman et al. | Oct. 10, 1939 |
| 2,216,964 | Stepp | Oct. 8, 1940 |
| 2,250,308 | Lindenblad | July 22, 1941 |
| 2,260,529 | Lindenblad | Oct. 28, 1941 |
| 2,285,372 | Strutt et al. | June 2, 1942 |
| 2,382,693 | Dallenbach et al. | Aug. 14, 1945 |